United States Patent
Lawless

(10) Patent No.: US 8,967,656 B2
(45) Date of Patent: Mar. 3, 2015

(54) MOBILIZATION DEVICE

(75) Inventor: Kevin Wilson Lawless, Hilton Head Island, SC (US)

(73) Assignee: Enhanced Mobilization System, Inc., Kalamazoo, MI (US)

( * ) Notice: Subject to any disclaimer, the term of this patent is extended or adjusted under 35 U.S.C. 154(b) by 554 days.

(21) Appl. No.: 13/051,308

(22) Filed: Mar. 18, 2011

(65) Prior Publication Data

US 2011/0227403 A1 Sep. 22, 2011

Related U.S. Application Data

(60) Provisional application No. 61/315,831, filed on Mar. 19, 2010.

(51) Int. Cl.
*B60B 35/04* (2006.01)

(52) U.S. Cl.
CPC ...................... *B60B 35/04* (2013.01)
USPC ............ 280/640; 280/38; 280/40; 280/43.15; 280/43.16; 280/47.26; 280/64; 280/659; 280/767

(58) Field of Classification Search
None
See application file for complete search history.

(56) References Cited

U.S. PATENT DOCUMENTS

| | | | | |
|---|---|---|---|---|
| 3,427,668 A | * | 2/1969 | McManus, Jr. | 5/503.1 |
| 6,561,529 B2 | * | 5/2003 | Darling, III | 280/79.2 |
| 6,698,811 B1 | * | 3/2004 | Schuchman | 296/20 |
| 7,461,857 B2 | * | 12/2008 | Darling, III | 280/640 |
| 2002/0047075 A1 | * | 4/2002 | Metz et al. | 248/229.1 |

FOREIGN PATENT DOCUMENTS

| WO | WO 2007/109267 A2 | 9/2007 |
|---|---|---|
| WO | WO 2007109267 A2 * | 9/2007 |

OTHER PUBLICATIONS

PCT Int'l App. No. PCT/US2011/028986 filed 18 Mar. 2011 May 3, 2011—International Search Report and Written Opinion.

* cited by examiner

*Primary Examiner* — J. Allen Shriver, II
*Assistant Examiner* — Hilary L Johns
(74) *Attorney, Agent, or Firm* — Reising Ethington PC

(57) ABSTRACT

A mobilization device adapted to be attached to a piece of conveying equipment such as a gurney. The device includes a base having a top and a bottom. The base supports an axle housing. An axle is disposed in the axle housing and extends therefrom. Wheel assemblies are disposed on the axle. The device includes a coupling receiver mounted on the top of the base. The coupling receiver includes a receiving element that can hold a support structure of the conveying equipment and hold the wheels of the conveying equipment off of the ground. The wheel assemblies of the device are used to move the conveying equipment and include tires having a relatively larger height and width to aid in increasing the mobility of the conveying equipment.

12 Claims, 6 Drawing Sheets

MOBILIZATION DEVICE

CROSS-REFERENCE TO RELATED APPLICATION

This application claims the benefit of U.S. Provisional Application No. 61/315,831 filed Mar. 19, 2010, the content of which is incorporated herein by reference in its entirety.

FIELD OF THE INVENTION

The present invention relates generally relates to a mobilization device. More specifically, the present invention relates to mobilization device that can be used in conjunction with conveying equipment such as a gurney to increase the ability of the conveying equipment to traverse terrain.

BACKGROUND OF THE INVENTION
SUMMARY OF THE INVENTION

Medical patient conveying equipment, such as cots, gurneys or carts typically have wheels for facilitating movement of patients on the equipment. The wheels typically are supported on the bottom of a frame which may be a fixed frame or a foldable frame. Such frames are well known. The wheels used on such equipment typically are of a relatively small diameter and are typically relatively thin.

Medical personnel, such as EMS personnel, paramedics or the like often have to convey patients from a remote site to a vehicle such as an ambulance. Often, the terrain between the remote site and the location of the ambulance is hostile and is often difficult to pass. Such hostile terrain may include uneven or pitched terrain, or may include brush, snow, sand, etc. Conveying equipment is not adequately designed to traverse pathways to typical trauma sites impeded by such hostile terrain, making it relatively difficult to move the conveying equipment carrying the patient and/or medical equipment. Weight of the patient may exacerbate the situation.

If medical personnel have difficulty getting the medical equipment to the patient or the patient to the ambulance, timeliness of patient treatment may be compromised. Accordingly it would be desirable to provide a device that can enhance the mobility of such conveying equipment to reduce the effect of impediments in the pathway of the conveying equipment.

SUMMARY OF THE INVENTION

According to the present invention, there is provided a mobilization device adapted to be attached to a piece of conveying equipment. The device may comprise a base and an axle supported on the base. The device further may comprise at least one wheel assembly disposed on the axle. The device further may comprise a coupling receiver disposed on said base. The coupling receiver may include a surface capable of supporting at least a portion of the conveying equipment.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
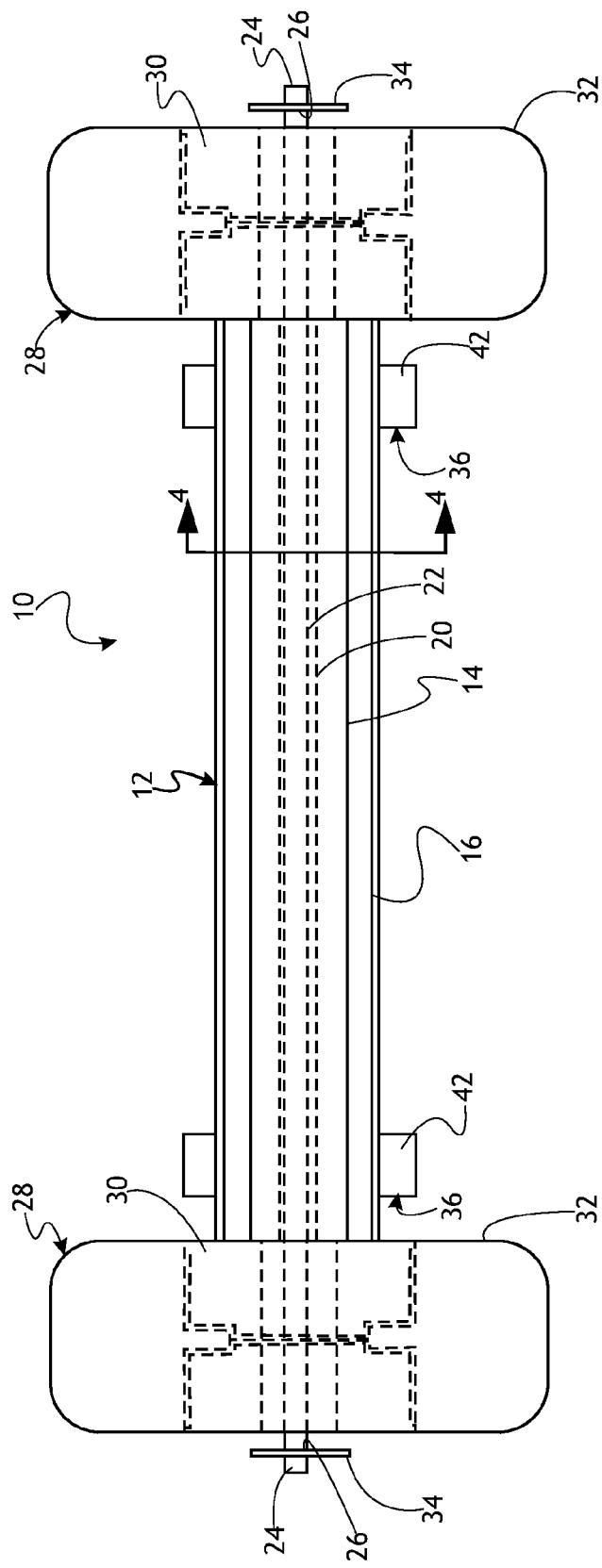
FIG. 1 is a bottom view of one embodiment.
Figure 2:
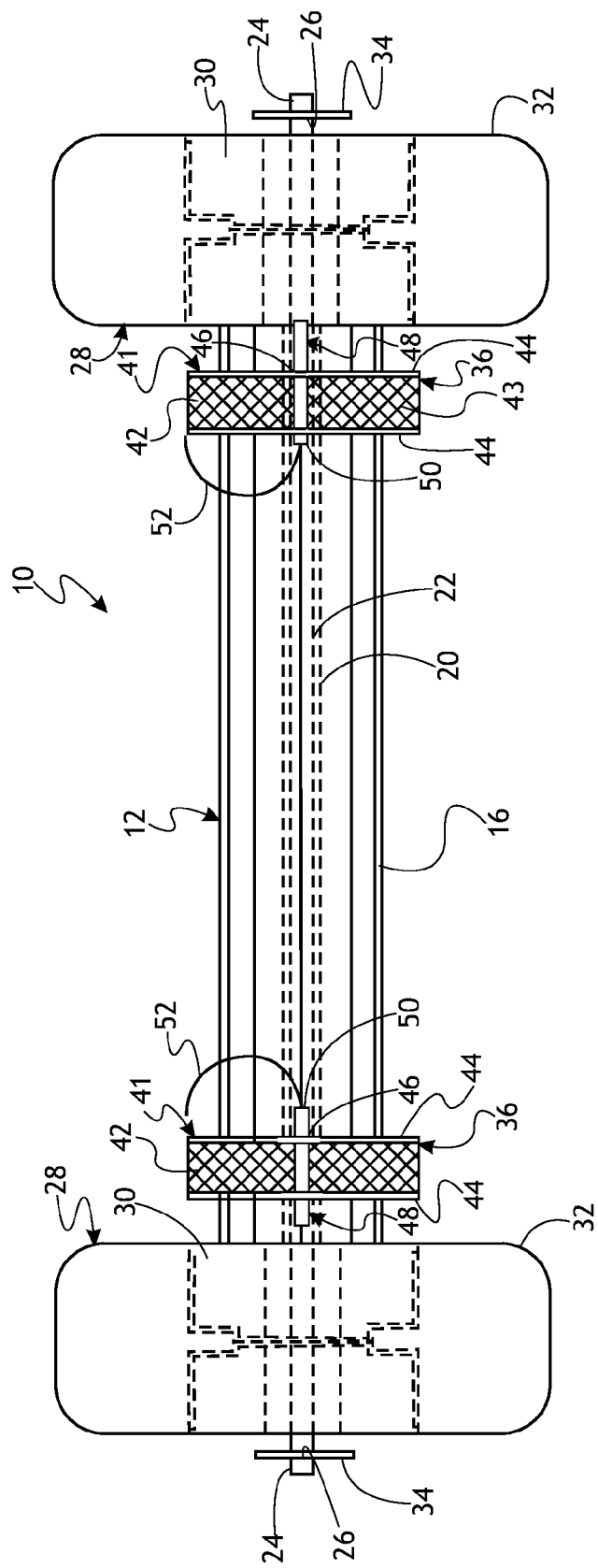
FIG. 2 is a top view of one embodiment.
Figure 3:
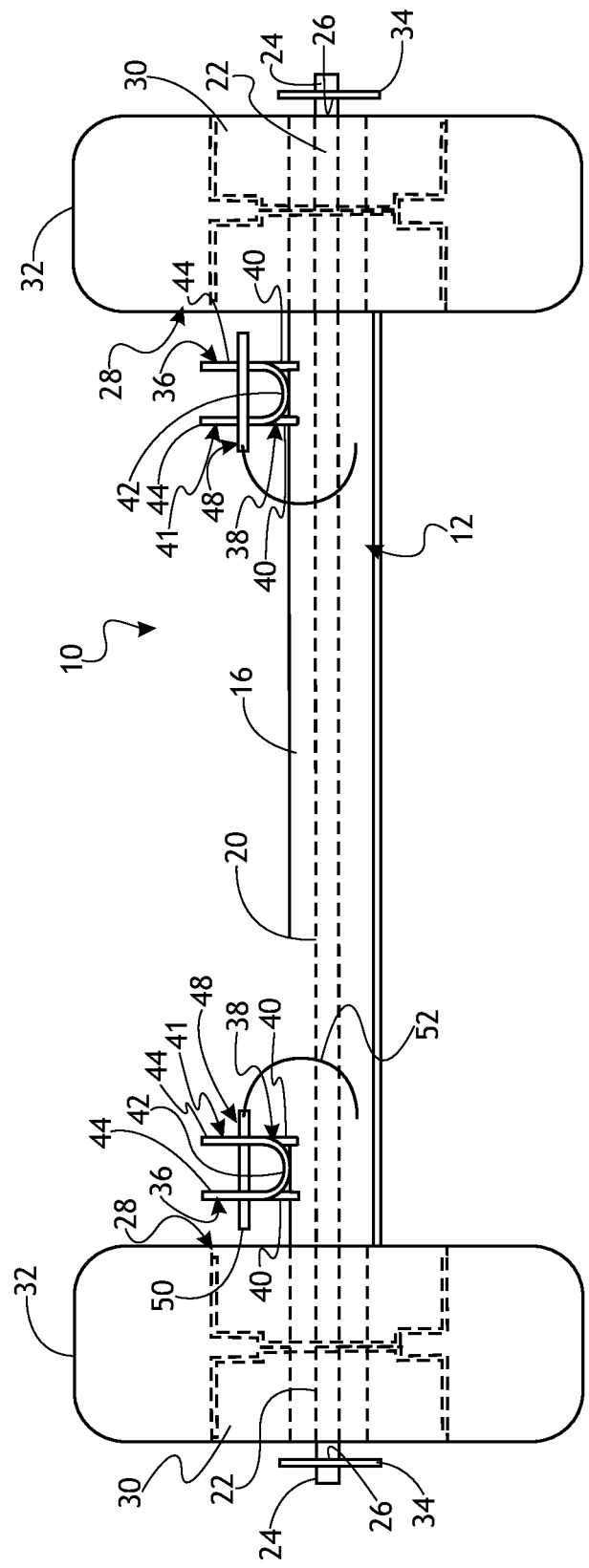
FIG. 3 is a front elevational view of one embodiment.
Figure 4:
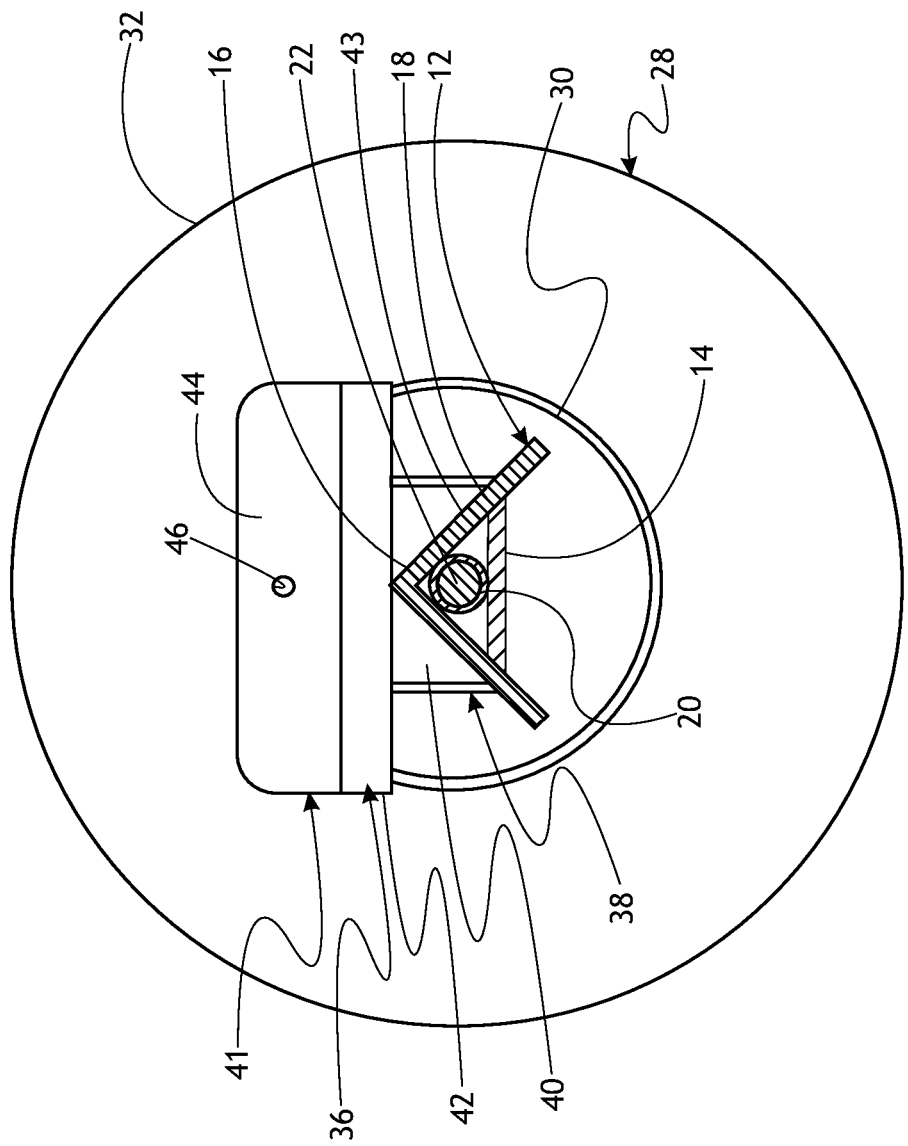
FIG. 4 is a cross-sectional view of one embodiment taken along lines 4-4 of FIG. 1.

A mobilization device is generally shown at 10 in the Figures. The device 10 may include a base, generally indicated at 12. In one embodiment, the base 12 includes a bottom 14 (best seen in FIG. 1) and a top 16 (best seen in FIG. 2). The bottom 14 may comprise a flat, generally rectangular bar. As best shown in FIG. 4, the side edges 18 of the bottom 14 may be angled to abut with the top 16. The bottom 14 may be made of any suitable material, including plastic, metal or composite material or combinations. In one embodiment, the bottom 14 comprises aluminum. Further, the bottom 14 may take any suitable geometric configuration. In some embodiments, the bottom 14 may be eliminated.

In one embodiment the top 16 may comprise an angled bar. The angle may be 90 degrees. The top 16 may come to an apex. The bottom 14 may cooperate with the top 16, and fit with the angled bar, as best seen in FIG. 4. The top 16 may be made of any suitable material, including plastic, metal or composite material or combinations. In one embodiment, the top 16 comprises a 90 degree angled aluminum bar. It will be appreciated that in other embodiments, the top 16 may take other geometric configurations. By way of non-limiting example, rather than come to an apex, the top 16 may have a generally flat upper surface (not shown). In such an embodiment, the top, having the generally flat upper surface may include depending sides, such that the top 16 may take the shape having a generally inverted u-shape with a relatively flat upper surface.

The device 10 may also include an axle housing 20. The axle housing 20 may be secured between the bottom 14 and the top 16. The axle housing 20 may comprise a tube having a circular cross section. The axle housing 20 can comprise any suitable material, including plastic, metal or composite material or combinations. In one embodiment, the axle housing 20 comprises aluminum pipe. In one embodiment, the axle housing 20 may be secured to the top 16. The axle housing 20 may be secured to the inside of the angle bar by any suitable method. By way of non-limiting example, the axle housing 20 may be welded to the top 16 such that it is positioned adjacent the apex. The bottom 14 may also be secured to the top 16 such as by welding. In this manner, the axle housing 20 is secured to the base 12 and is positioned between the top 16 and bottom 14.

In one embodiment an axle 22 is supported within the axle housing 20. The end 24 of the axle 22 may protrude outwardly of the axle housing 20 to support a tire as will be described in greater detail below. In one embodiment, the axle 22 will protrude outwardly of the axle housing 20 from each end of the axle housing 20 to support a wheel assembly 28 on each end 24 of the axle 22. The axle 22 may comprise a rod having a generally circular cross section. The axle 22 may include an aperture 26 through each end 24. The axle 22 may be disposed in the axle housing 22. The axle housing 22 may comprise any suitable material, such as plastic, metal or composite material or combinations. In one embodiment, the axle comprises a stainless steel rod.

In one embodiment, the axle 20 may not be fixed within the axle housing 22 and may rotate relative thereto. It will be appreciated that the axle 22 may be fixed within the axle housing 20, such as by welding the axle 22 to the axle housing 20, or by proving a friction fit that will limit relative rotational movement between the axle 22 and axle housing 20. In one embodiment, the axle housing 20 may be eliminated. In such embodiment, the axle 22 may be secured directly to the base 12.

In one embodiment, the axle 22 may comprise separate axle components (not shown) each extending outwardly from the axle housing 20 in opposite directions. In this manner, the axle components, such as two axle rods may be secured to the axle housing 20 by any suitable method. As with an embodiment described above, the axle housing 20 may be eliminated. In this embodiment, the separate axle components may be secured near the outer edges of the base 12 and extend outwardly therefrom. Thus, the axle 22 is supported by the base 12 either by being connected directly to the base 12 or indirectly to the base 12 via the axle housing 20.

A wheel assembly, generally indicated at 28 may be mounted on each end 24 of axle 22. The wheel assembly 28 comprises a hub 30 and a tire 32. The hub 30 may include internal bearings (not shown) that allow the wheel assembly 28 to rotate about the axle 22 in conventional manner. Thus, the wheel assembly 28 is rotatably disposed on the axle 22. The hub 30 can comprise any suitable material, including plastic, metal or composite material or combinations.

The tire 32 is disposed about the hub. In one embodiment, the tire 32 is a pneumatic tire that can include an inner-tube (not shown) or be of the tubeless variety, as are well-known. The tire 32 may also include a tread, but a tread is not necessary. Any suitable tread design may be used.

The wheel assembly 28 may be sized so that it can hold the conveying equipment off the ground during use. (FIG. 6) In one embodiment, the outer diameter of the tire 32 may be up to about 13 inches. Also, in one embodiment, the width of the tire 32 may be up to about 5 inches. The specific outer diameter and width of the tire 32 may differ, and any suitable size may be used. Further, it is preferred that the wheel assembly 28 have sufficient load rating to allow the wheel assembly 28 to be used in the device 10 to convey the equipment and any necessary load on the conveying equipment, such as a patient or medical equipment. In one embodiment, the wheel assembly 28 may have a load rating at or above four hundred and thirty-five pounds.

The wheel assembly 28 is retained on the axle 22 by a retaining pin 34 disposed through the aperture 26 in the axle 22. In one embodiment, the retaining pin 34 comprises a hitch pin having a locking clip as are well known. In one embodiment, the retaining pin 34 comprises a cotter pin. The retaining pin 34 may comprise any configuration suitable to retain the wheel assembly 28 on the axle 22. In one embodiment, two retaining pins 34 are used, one through each aperture 26 on each end 24 of axle 22. In this manner, two wheel assemblies 28 are retained on the axle 22 on opposite ends of the axle 22 and outwardly of the base 12.

The device 10 may further comprise a coupling receiver, generally shown at 36. The coupling receiver 36 may be disposed on the base 12. In one embodiment, the coupling receiver 36 is secured to the top 14. The coupling receiver 36 may include a connecting portion, generally indicated at 38. The connecting portion 38 may be secured to the top 16. In one embodiment, the connecting portion 38 comprises two upstanding walls 40. The upstanding walls 40 may be generally rectangular in shape, having a v-shape cut out area 43. The v-shape cut out area 43 may accept the top 14, as best seen in FIG. 4. Two upstanding walls 40 may be slightly spaced from one another. The upstanding walls 40 may comprise any suitable material, including metal, plastic or composite material or combinations. In one embodiment, the upstanding walls 40 comprise aluminum plates. The upstanding walls 40 may be fixed from to the top 14 by any suitable means. By way of non-limiting example, the upstanding walls 40 may be welded to the top 14. In another embodiment (not shown) the connecting portion 38 may be secured to the top 14 in a sliding arrangement such as in a track secured to the top 14 that can selectively be locked in place. That is, the upstanding walls may be retained in a track that may be secured on the top 14. In this embodiment, the connecting portion 38 may be selectively positioned along the longitudinal axis of the top 14 at any desired location and then locked thereto, such as by the use of a set screw or any other securement mechanism used to retain the upstanding walls to the track or top. This embodiment allows the device 10 to be secured to conveying equipment having support structures of varying positions.

The coupling receiver 36 may further include a receiving element, generally indicated at 41 for receiving and supporting at least a portion of the conveying equipment. In one embodiment, the receiving element 41 may comprise a generally u-shape channel member, having a U-shaped base portion 42 and a pair of opposing upstanding walls 44. The receiving element 41 may be disposed on the upper portion of the upstanding walls 40. In this manner, the receiving element 41 is supported above the top 14. The receiving element 41 may comprise any suitable material, including metal, plastic or composite material or combinations. In one embodiment, the receiving element 41 may comprise aluminum bar that is machine rolled into the U-shape channel member. The diameter of the base portion 42 may be such that it can accept a portion of the conveying equipment. Thus the conveying equipment, and typically a support structure thereof can be disposed in the receiving element 41 between the upstanding walls 44 and on the base portion 42. (FIG. 6) The base portion 42, upstanding walls 44 or both may also include a friction surface 43, such as a textured surface or anti-slip pad thereon. In this way, the friction surface may aid holding the conveying equipment in place. The receiving element may be disposed such that the longitudinal axis of the receiving element is generally perpendicular to the longitudinal axis of the top 14.

Figure 6:
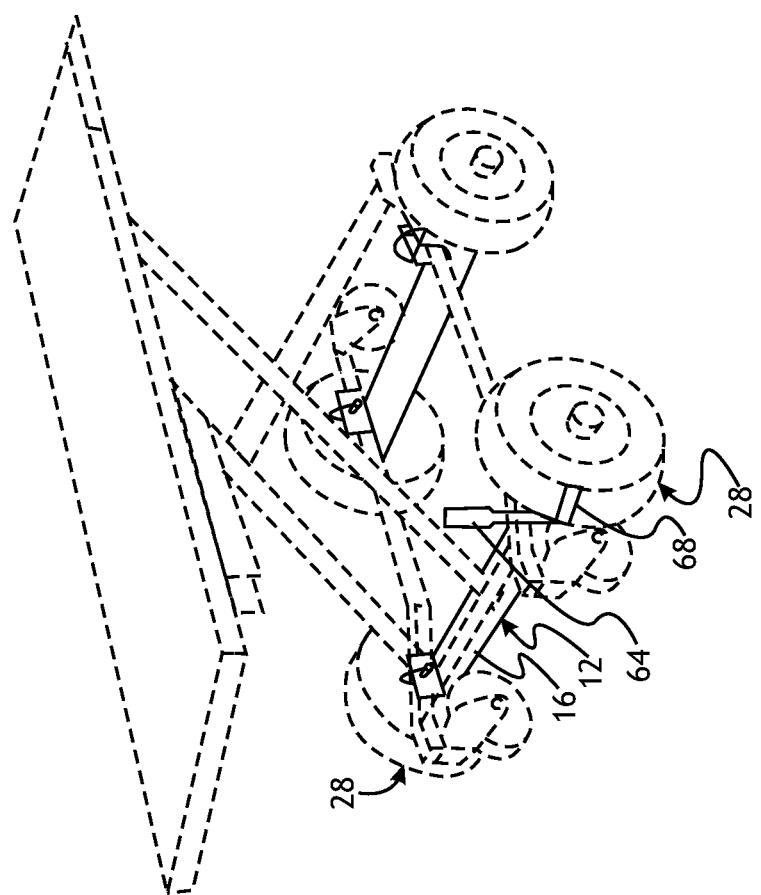
FIG. 6 is a perspective view of one embodiment attached to conveying equipment.

Each upstanding wall 44 may further include at least one aperture 46 therethrough. The aperture 46 may receive a retaining clip, generally indicated at 48. In one embodiment, the retaining clip 48 may comprise a clevis pin 50 having a generally D-shaped locking member 52. One end of the D-shaped locking member 52 may be pivotally secured to one end of the clevis pin 50. The other end of the D-shaped locking member 52 may selectively engage and coact with the other end of the retaining clevis pin 50 in conventional manner. The aperture 46 may be positioned on the upstanding wall 44 at any suitable location. In one embodiment, the aperture 46 may be positioned such that it will allow the clevis pin 50 to be disposed on top of any portion of the conveying equipment that is supported in the receiving element 41 (FIG. 6). It will be appreciated that while one aperture 46 is shown through each upstanding wall 44, any number of apertures 46 may be used. Further, the apertures 46 may be at different heights with respect to the base portion 42 to accommodate portions of conveying equipment of different sizes. It will be further appreciated that the retaining clip may take any suitable configuration.

In one embodiment as shown in the Figures, the receiving element 41 is disposed in a manner that is generally parallel with the ground and may be fixed in that position. In another embodiment (not shown) the receiving element may be pivotal between different positions and selectively locked in place. In this embodiment, the receiving element 41 may be pivoted such that it is disposed at any angle with respect to the ground such that the receiving element 41 can accommodate structures of the conveying equipment that are other than generally horizontal.

Conventional conveying equipment (a portion of which is shown in FIG. 6) typically include wheels disposed on some type of support structure or legs. Often the front and rear legs of the conveying equipment are connected by a support structure that is generally horizontally disposed between the front and rear legs of the conveying equipment. In this case, the receiving element 41 may be disposed generally horizontally to receive the support structure of the conveying equipment as seen in FIG. 6. In other instances, the legs may be angles such as at about a 45 degree angle with respect to the ground and may not include a horizontal support structure between the front and rear legs. To accommodate this situation, an embodiment (not shown) may allow the receiving element 41 to be pivoted and angled with respect to the ground to receive the angled leg of the conveying equipment. Then the receiving element 41 may be secured in place relative to the top 16.

Figure 5:
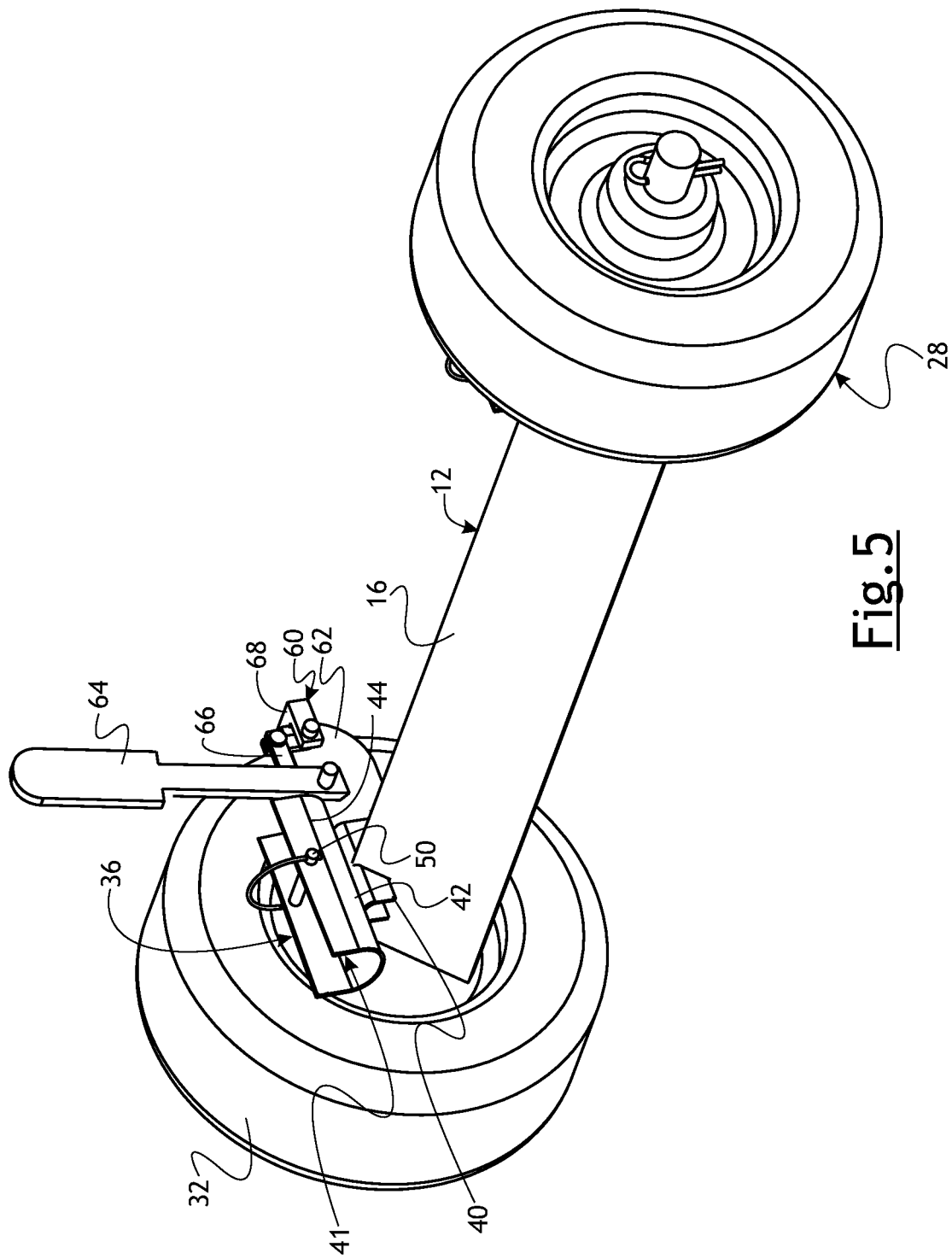
FIG. 5 is a perspective view of one embodiment.

The device 10 may also include a brake assembly, generally indicated at 60. The brake assembly 60 is moveable between engaged and disengaged positions to selectively engage the wheel assembly 28. In one embodiment, as best seen in FIG. 5, the brake assembly 60 may include a support plate 62. The brake assembly 60 may include a handle 64 pivotally mounted on the support plate 62. The brake assembly 60 may further include a linkage member 66. The linkage member 66 may be pivotally secured to a tire engagement member 68. The tire engagement member 68 may selectively engage the tire 32 to inhibit movement of the tire 32 to thereby inhibit movement of the conveying device in the event it may be necessary to secure the conveying device. That is, handle 64 may be pivoted relative to the support plate 62 causing tire engagement member 68 to engage the tire 32. Similarly, handle 64 may be pivoted relative to the support plate 62 causing the tire engagement member 68 to disengage the tire 32.

It will be appreciated that any suitable brake assembly 60 may be used. Further, the brake assembly 60 may act on any portion of the tire assembly 30 or axle 32.

In order to assemble a device 10 according to one embodiment, the top 16 is obtained. The axle housing 20 may be fixed to the top 16, adjacent the apex, such as by welding. The bottom 14 may be then positioned adjacent the axle housing 20 with the edges of the bottom 14 in proximity to the two walls of the top 16. The bottom 14 may be secured to the top such as by welding, and having the axle housing 20 disposed between the top 16 and bottom 14. A pair of coupling receivers 36 may be secured on the top 16 and along the longitudinal axis of the top 16. This may be done by welding the walls 40 of the coupling receivers 36 to the top 16. The coupling receivers 36 may be spaced along the top 16 such that they can each engage a different portion of the support structure. In one embodiment, one receiver 36 may engage a generally horizontally disposed support structure adjacent one leg of the conveying equipment and the other receiver 36 may engage a generally horizontally disposed support structure adjacent another leg of the conveying equipment. In this manner either of the two front or two rear wheels of the conveying equipment are supported at a position above the ground.

The axle 22 may then be placed into the axle housing 20. The axle 22 is inserted into the axle housing 20 such that the ends of the axle 22 may extend substantially equidistant from the respective ends of the axle housing 20. A wheel assembly 28 may be positioned on each end of the axle 22 protruding from the axle housing 20. The retaining pins 34 may then be placed through apertures 26 in each end of the axle to thereby retain the wheel assembly 28 on the axle 22 between the retaining pins 34 and axle housing 20. The retaining pin 34 may then be locked in place in any suitable manner.

The device 10 may be releasably secured to conveying equipment. In one embodiment, the device 10 is placed adjacent either the front or rear legs of the conveying equipment and parallel to either the front or rear wheels. The conveying equipment may then be lifted and the generally horizontal support structure adjacent the legs can be placed into each receiving element 41 and supported thereby. The clevis pins 50 may then be passed through apertures 46 and the locking clips 52 may be secured in the well known manner. The support structure of the conveying equipment is thus supported on the device 10 and is retained between the receiving element 41 and the clevis pins 50, as can be seen in FIG. 6.

When the device 10 is connected to the conveying equipment, the device may effectively increase the wheel base of the conveying equipment, aiding in the stability of the conveying equipment. This is because the wheel assemblies 28 of the devices 10 are laterally outside of the wheels of the conveying equipment (FIG. 6). Further the relatively larger tires 32 allow the conveying equipment, when connected to the device, to more easily traverse hostile terrain. In addition to the greater surface area of the tire aiding in moving the conveying equipment, the additional height of the wheel assembly 28 may hold the conveying equipment higher off the ground, increasing ground clearance between the conveying equipment. Also the load carrying capacity of the conveying equipment over hostile terrain may be effectively increased as a result of using the device 10. The larger tires 32 may distribute the load over a greater area, thus reducing tire trenching which may be a problem in certain instances with conventional conveying equipment.

It will be appreciated that only one device 10 may be used in conjunction with conveying equipment. In this embodiment, the device 10 may create a wheelbarrow effect. The end of the conveying equipment opposite the end to which the device 10 is attached can be pivoted by a user and the conveying equipment can be moved on the wheel assemblies 28 of the device 10. In another embodiment, two devices 10 may be used in conjunction with the conveying equipment; one device 10 disposed on each of the front and rear ends. In this embodiment, all of the wheels of the conveying equipment are off the ground and the wheel assemblies 28 of the devices 10 are used to support and move the conveying equipment.

The device 10 can thus be easily secured to conveying equipment to enhance the mobility of the conveying equipment. Further, the device 10 can easily be removed from the conveying equipment when its use may not be necessary. It will also be appreciated that the device can be used in connection with equipment that may not ordinarily have wheels, thus providing the ability to move such equipment.

The device has been described as having many parts that may be secured together. It will be appreciated that any of the components described herein may be combined and integrally formed from one piece. Additionally some of the components may be eliminated in certain embodiments.

The foregoing description is considered illustrative only of the principles of the invention. The terminology that is used is intended to be in the nature of words of description rather than of limitation. Furthermore, because numerous modifications and changes will readily occur to those skilled in the art, it is not desired to limit the invention to the exact construction and process shown as described above. Accordingly, all suitable modifications and equivalents that may be resorted to fall within the scope of the invention as defined by the claims that follow.

What is claimed is:

1. A mobilization device adapted to be attached to a piece of conveying equipment comprising:
   a base;
   an axle supported on said base;
   at least one wheel assembly disposed on said axle;
   and a coupling receiver disposed on said base, said coupling receiver including a receiving element, the coupling receiver releasably securable with the conveying equipment
   whereby when the coupling receiver is secured to the conveying equipment, the wheel assembly is engageable with the ground to support at least a portion of the conveying equipment above the ground.

2. A mobilization device as set forth in claim 1 wherein said coupling receiver comprises a connecting portion secured to said base and secured to said receiving element.

3. A mobilization device as set forth in claim 2 wherein said receiver element comprises a generally u-shaped channel member.

4. A mobilization device as set forth in claim 3 wherein said receiver element includes a friction surface.

5. A mobilization device as set forth in claim 1 wherein said receiving element includes an aperture for receiving a retaining clip to allow the conveying equipment to be releasably retained between the receiving element and the retaining clip.

6. A mobilization device as set forth in claim 1 wherein said wheel assembly is sized to hold a piece of conveying equipment off the ground.

7. A mobilization device as set forth in claim 1 wherein said base comprises a top and a bottom.

8. A mobilization device as set forth in claim 7 wherein said coupling receiver is selectively positionable along a longitudinal axis of said top.

9. A mobilization device as set forth in claim 7 further comprising an axle housing, said axle housing disposed between said base and said top.

10. A mobilization device as set forth in claim 1 wherein said axle is disposed between said base and said top.

11. A mobilization device as set forth in claim 1 further comprising a brake assembly moveable between engaged and disengaged positioning to selectively engage said wheel assembly.

12. A mobilization device as set forth in claim 1 wherein said wheel assembly is configured to be disposed outside of the support structure of the conveying equipment.

* * * * *